W. G. CLARK.
TRACTION-WHEELS.

No. 194,956. Patented Sept. 11, 1877.

Witnesses:
E. E. Masson,
Ewell A. Dick.

Inventor:
Wm. G. Clark
F. Curtis, Atty.

UNITED STATES PATENT OFFICE.

WILLIAM G. CLARK, OF CHELSEA, MASSACHUSETTS.

IMPROVEMENT IN TRACTION-WHEELS.

Specification forming part of Letters Patent No. 194,956, dated September 11, 1877; application filed January 2, 1877.

*To all whom it may concern:*

Be it known that I, WILLIAM G. CLARK, of Chelsea, in the State of Massachusetts, have invented certain new and useful Improvements in Motor Power, of which the following is a specification:

The invention for which I apply for Letters Patent consists in a combination of cog-wheels so arranged that, by applying steam or other motive power to shafts connected with said wheels, giving rotary motion, which motion, being terminated in an internal-geared wheel resting upon the ground, causes lineal direction over it, thus producing a principle of carriage to be a motor for plowing the ground and doing agricultural work, and also for a common highway motor for the transportation of merchandise, commodities, and passengers.

The nature of my invention, and the manner in which the same is or may be carried into effect, will be readily understood by reference to the accompanying drawing, in which—

Figure 1:
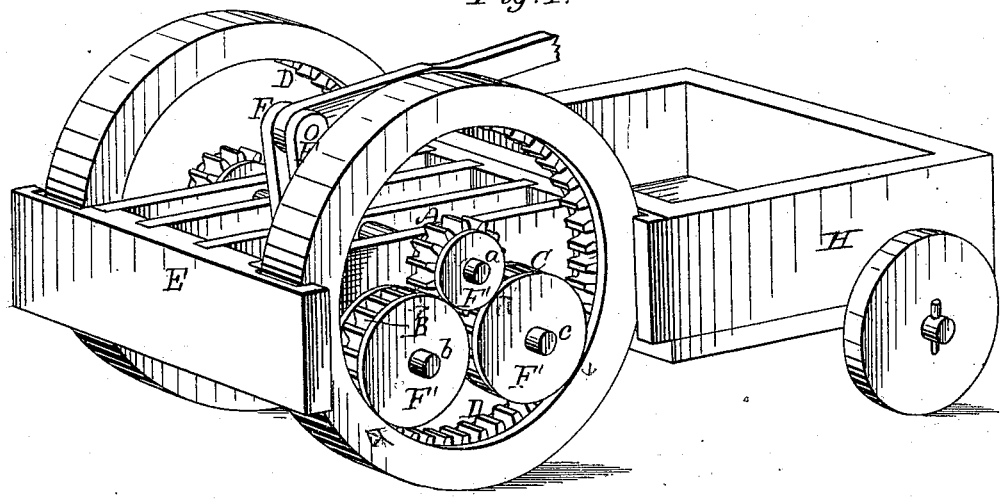
Figure 2:
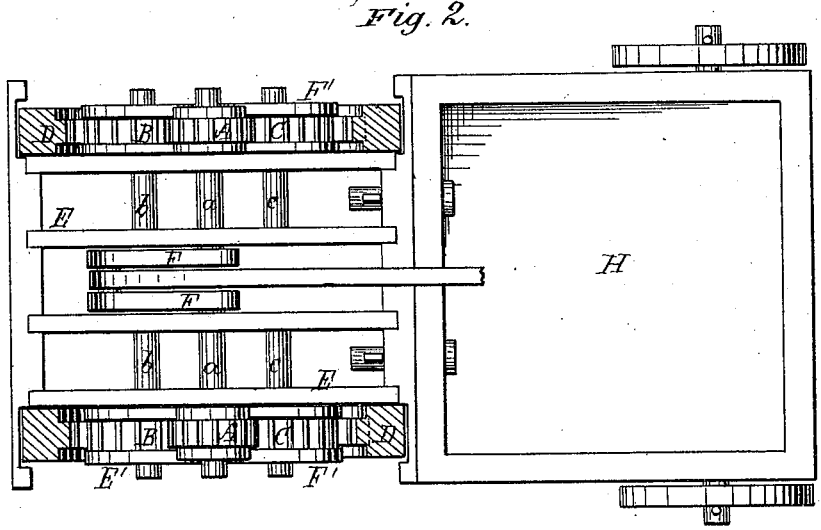

Figure 1 is a perspective view, and Fig. 2 a horizontal view, of my improved motor power.

A set of four gears, A, B, C, and D, form one side, and a duplicate set the other, one pinion, A, meshing into two followers, B C, and these two followers meshing into an internal-geared wheel, D, which rests upon the ground. Each pinion A and each follower B or C is affixed to a shaft, *a*, *b*, or *c*, and all these shafts are affixed to a frame, E, upon which frame is to be fastened an engine of sufficient power to do the work required.

To each pinion-shaft *a* I connect a crank, F. I intend, in practice, to combine with such shaft clutches, one for each set of wheels, these clutches being to change the direction of the carriage by stopping one or the other set, to turn to the right or left, or to turn about, as desired.

In order to relieve the teeth of the several gears or toothed wheels A B C D of the weight and thrusts of the machine and its load, I cast upon or secure to the end of each a flange or hub, F′, these flanges being of such relative diameter and position with respect to the axis of the wheels as to bear upon each other before the teeth bottom.

The frame H, which supports the engine or motor, may be made of any required length, the rear end being supported by ordinary wheels and axles, the height of such frame being determined by the diameter of the followers and pinion-wheels. The followers B and C, when in proper place, meshing into the internal-geared wheel, are below the center of the said internal-geared wheel, and such geared wheel may be made of any required diameter or thickness.

Two or more additional followers or pinions may be employed for strength and support of the machine, or for the regulation and safety of the same.

The sides of the geared wheels may be protected from clogging, by earth, dust, or other foreign substances, by means of a shield or plate secured to the rim of the ring-gear D.

The engine and boiler are to be placed upon the frame H in such a manner as to insure an equal distribution of the weight of the same upon the geared wheels, thus preserving the safety of the carriage by proper equilibrium upon said frame.

What I claim, and desire to secure by Letters Patent, is—

The combination of the ring-gear wheels D with the driving-pinions A and intermediate gears B and C, substantially as described, the pinion-shafts being rotated by a crank or other means, and the whole operating essentially as set forth.

WILLIAM G. CLARK.

Witnesses:
HERBERT CLARK,
GEORGE D. CLARK.